United States Patent
Bruecken

(10) Patent No.: US 7,058,404 B2
(45) Date of Patent: Jun. 6, 2006

(54) METHOD FOR CARRYING OUT A BLIND HANDOVER IN AN INTERSYSTEM AND INTERFREQUENCY HANDOVER IN MOBILE COMMUNICATION SYSTEMS

(75) Inventor: Reinhold Bruecken, Köln (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 10/519,316

(22) PCT Filed: Jun. 25, 2003

(86) PCT No.: PCT/DE03/02121

§ 371 (c)(1),
(2), (4) Date: Dec. 23, 2004

(87) PCT Pub. No.: WO2004/004393

PCT Pub. Date: Jan. 8, 2004

(65) Prior Publication Data

US 2005/0170836 A1    Aug. 4, 2005

(30) Foreign Application Priority Data

Jun. 27, 2002 (DE) ................................ 102 28 885

(51) Int. Cl.
*H04Q 7/20* (2006.01)
(52) U.S. Cl. .................. 455/436; 455/442; 370/331
(58) Field of Classification Search ............... 455/436, 455/442, 432.1, 435.1, 435.2, 437, 438, 439, 455/443, 444, 458, 450; 370/331, 329
See application file for complete search history.

(56) References Cited

U.S. PATENT DOCUMENTS 5,487,174 A * 1/1996 Persson ...................... 455/444

(Continued)

FOREIGN PATENT DOCUMENTS

DE    198 03 960 A1    8/1998

(Continued)

OTHER PUBLICATIONS

3GPP:TS 25.305 V3.6.0 (Jun. 2001) 3rd Generation Partnership Proj.: Technical Spec. Group Radio Access Network; Stage 2 Funct. Spec. UE Positioning in UTRAN (Release 1999).

(Continued)

*Primary Examiner*—Charles Appiah
*Assistant Examiner*—Nghi H. Ly
(74) *Attorney, Agent, or Firm*—Myron Greenspan, Esq.; Lackenbach Siegel, LLP

(57) ABSTRACT

The invention relates to a method for carrying out a so-called "blind handover" in an intersystem and interfrequency handover in mobile communication systems and builds on the fact that before the handover a mobile station is supplied by several base stations, i.e., in addition to the supplying base station, it can also receive signals from several other base stations. According to the invention a propagation time measurement is carried out at the air interface by the mobile station of the signals received from the base stations. The measured propagation times are transmitted to one of the base stations. Thereupon the residence site of the mobile station is determined on the part of the mobile communication network based on the transmitted propagation time measurement data. With the aid of a data base, subsequently and based on the determined residence site, at least one suitable base station for an intersystem or interfrequency handover is selected, and the data of the selected base station required for a handover are transmitted to the mobile station. Based on this information the mobile station can carry out the handover to the selected base station.

12 Claims, 1 Drawing Sheet

U.S. PATENT DOCUMENTS

Figure 1:
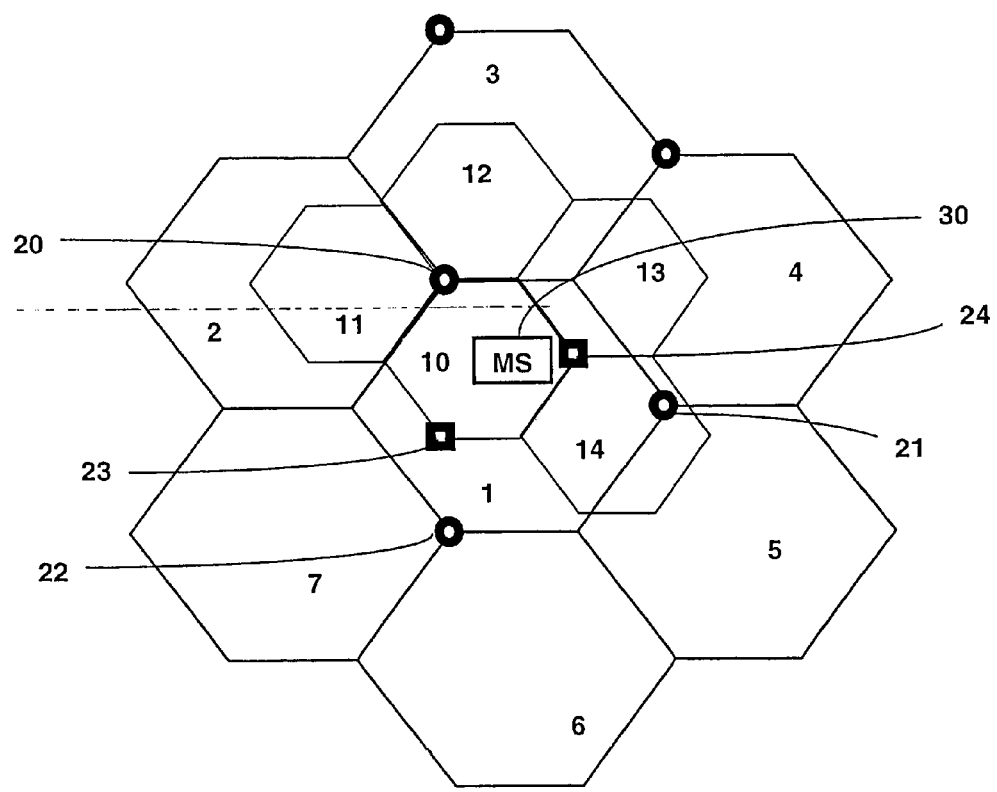

| | | | | |
|---|---|---|---|---|
| 5,850,600 | A | * | 12/1998 | Dixon ................... 455/422.1 |
| 6,073,021 | A | * | 6/2000 | Kumar et al. ............... 455/442 |
| 6,154,657 | A | * | 11/2000 | Grubeck et al. ......... 455/456.2 |
| 6,240,292 | B1 | | 5/2001 | Haberman et al. |
| 6,477,183 | B1 | * | 11/2002 | Yamamoto ................. 370/508 |
| 6,741,577 | B1 | * | 5/2004 | Henon ....................... 370/331 |
| 6,816,729 | B1 | * | 11/2004 | Halonen .................... 455/436 |
| 6,829,485 | B1 | * | 12/2004 | Abrishamkar et al. ...... 455/458 |
| 6,876,853 | B1 | * | 4/2005 | Hokkanen .................. 455/440 |

FOREIGN PATENT DOCUMENTS

| | | |
|---|---|---|
| DE | 197 41 701 A1 | 3/1999 |
| DE | 198 36 778 A1 | 2/2000 |
| DE | 199 16 688 A1 | 10/2000 |
| EP | 1 213 941 A2 | 6/2002 |
| WO | PCT WO 99/012378 A1 | 3/1999 |
| WO | PCT WO 00/28774 A1 | 5/2000 |
| WO | PCT WO 02/01902 A1 | 1/2002 |

OTHER PUBLICATIONS

Oliver Balbach, "UMTS—Competing Navigation System and Supplemental Communication System to GNSSS," Sep. 19-22, 2000.

Jacek Biala, "Mobilfunk und intelligente Netze." Vieweg Verlag: 1995, 184-85.

3GPP:TS 23.009 V5.1.0 (Jun. 2002) "3rd Generation Partnership Project: Technical Specification Group Core Network, Handover procedures" (Release 5).

* cited by examiner

METHOD FOR CARRYING OUT A BLIND HANDOVER IN AN INTERSYSTEM AND INTERFREQUENCY HANDOVER IN MOBILE COMMUNICATION SYSTEMS

BACKGROUND OF THE INVENTION

1. Field of the Invention

The invention relates to a method for carrying out a so-called 'blind handover' in an intersystem and interfrequency handover in mobile communication systems, in particular in inhomogeneous network structures of the participating mobile communication systems.

2. Description of the Prior Art

In the case of inhomogeneity of the different network structures, i.e. different frequency positions or coverage areas of the participating networks, no ensurance for the successful completion of the HO can be given in a so-called blind handover (HO).

The specification currently in effect provides that, for example, in a handover between a UMTS layer and a GSM layer, per UMTS cell, one HO candidate for a blind handover can be configured. In this case it is assumed that the coverage area of the target cell agrees with the source cell. Stated differently, the coverage area of the particular cell of the UMTS and of the GSM network are congruent at the site of the handover. Otherwise the resulting situation is ambiguous. The consequence would be an HO error and therewith the risk of losing the connection (call drop).

To avoid these problems in a blind handover, so-called dual mobile subscriber terminal sets, i.e. mobile telephones with two separate transmitting/receiving devices can be utilized, which are capable of operating simultaneously at two frequencies or in two mobile networks.

The signaling between subscriber terminal set and the participating network nodes, such as for example base stations, RNC (Radio Network Controller) and the mobile switching centers (UMSC) of the participating mobile communication networks, exchanged during a handover, is not subject matter of the method described here. It is therefore not further discusssed in the following.

SUMMARY OF THE INVENTION

The invention aims to specify a method with which even blind handovers can be carried out without high risks between the different layers of mobile communication systems, even if these do not have a common network structure.

The invention builds on the fact that, before the handover, a mobile station is supplied from several base stations. This means that, apart from the supplying base station, it can also receive signals from several other base stations. According to the invention a propagation time measurement is carried out at the air interface by the mobile station of the signals received from the base stations. The measured propagation times are transmitted to one of the base stations. Thereupon, on the basis of the transmitted propagation time measurement data, the mobile communication network determines the [temporary] residence site of the mobile station. With the aid of a data base subsequently on the basis of the determined residence site at least one suitable base station for an intersystem or interfrequency handover is selected, and the data of the selected base station, required for a handover, are transmitted to the mobile station. In conjunction with this information the mobile station can carry out the handover to the selected base station.

With this method the capability is given of unerringly carrying out such HOs with a further developed blind handover, also referred to in the following as blind handover advanced.

The described method leads to important advantages:

In the so-called UMTS compressed mode, requisite HO measurements must be initiated, which, depending on the situation and number of HO candidates, make several GAPs (General Access Profile) necessary. In a blind handover according to the invention no time is lost.

Through the mechanism of the Compressed Mode (CM), additional interference is generated in the network. In turn, this means a reduction of capacity. In contrast, through the described method an increase of capacity is attained, since no CM is necessary.

Through the method, other mobile communication services, which require place of location information of the subscriber, can be implemented without major additional engineering efforts.

The method functions within as well as also outside of buildings without additional GPS.

The terminal sets do not need to be equipped with GPS or be implemented as dual terminal sets (with two transmitting/receiving units) and therefore can be produced more cost-effectively.

Advantageous embodiments and further developments of the invention will be evident to those skilled in the art.

To determine the site information the subscriber terminal set must measure the [signal] level conditions in its own cell and at least in one or two further cells. In addition to the signal levels, the signal propagation times at the air interface are also measured. Should this actually not be required, due to the current level conditions of the supplying cell, the terminal set by necessity has to be requested to carry out this measurement. This can, for example, be performed thereby that to the terminal set specifically other supply level threshold values are transmitted which compel a measurement or that the parameter of the network are set at the outset such that performance of these measurements becomes mandatory.

The information of the signal propagation times generated in this manner is transmitted to the network. To be able to utilize this information for a blind handover, the layer in which the potential target cell is located must previously be analyzed for the base station providing the best supply, thus the best server has to be determined. This can be carried out in different ways. For one, the coverage area of the best server can be determined with appropriate methods and, for another, this can be done from available measuring data. The best servers determined in this manner can be assigned at each point via [the geometry of] the polygon.

The coordinates of the terminal set are subsequently compared with the best server data base and in this way the appropriate target cell is selected. This target cell is subsequently transmitted through an HO command to the terminal set and therewith the blind handover advanced is specifically completed.

BREIF DESCRIPTION OF THE DRAWING

An embodiment example of the invention will be explained in further detail with reference to the drawing.

FIG. 1 depicts by example a section of the cell structures of two superimposed mobile communication networks, for example a UMTS network and a GSM network.

DECRIPTION OF A PREFERRED EMBODIMENTS

The UMTS network comprises a multiplicity of radio cells 10–14 supplied with radio signals by a multiplicity of fixedly installed base stations 20, 23, 24. The GSM network similarly comprises a multiplicity of radio cells 1–7 supplied with radio signals by a multiplicity of fixedly installed base stations 20–22. The UMTS and the GSM network have, for example, the place of location for base station 20 in common.

A mobile station 30 is located within UMTS cell 10 and is supplied with radio signals by, for example, base station 24. The mobile station 30 intends to carry out a blind handover in a suitable radio cell of the GSM network.

According to the invention, for this purpose, first, the residence site of the mobile station 30 must be determined.

Through a suitable application, the terminal set is requested to measure the supply level and the quality of the base station 24 and of the neighboring UMTS base stations 20, 23. From the terminal set [sic] 30 the appropriate base stations 20, 23, 24 must herein be unambiguously identified and the associated propagation times of the signal at the air interface must be determined. This information of the neighboring cells and of the own cell are sent as an information packet to a base station, for example 24.

The place of location of the terminal set 30 can consequently be calculated in the UMTS network from only two measured neighboring cells and the own cell. This method does not depend on the residence site of the terminal set either within or outside of a building.

To determine the residence site of a subscriber terminal set without knowing the direction information, thus at least three base stations 20, 23, 24 are necessary, whose precise place of location is known. Based on the measurements of the propagation time of the signals between the terminal set and each of the base stations, circular rings can be calculated which define the distance range of the terminal set from the particular base station. In the center of each circular ring is located a base station. The common intersection point of the three circular rings is the residence site of the terminal set. The places of location of the base stations are herein reference points, the place of location coordinates being available from the place of location data base of the network operator.

In theory, the three circles intersect in one point. Under real conditions, this is impossible since the propagation time measuring principle must depend on the propagation conditions and the processing speed of the signals in the microchip of the terminal set (chip frequency). The path segments per measuring interval cannot be arbitrarily small.

This means in practice that the residence sites of the terminal set is described by a surface of intersection. Therein the accuracy of the place of location determination increases with the number of measured base stations. Through a chip frequency of, for example, 3.84 Mhz, the smallest measuring interval a per chip can be calculated to be $$a = \text{speed of light } C/\text{chip frequency } f_{bit} = 300*10^6 / 3.84*10^6 = 78 \text{ m}$$

With modern terminal sets in practice very much better measuring accuracies can be obtained.

The accuracy also depends on the receiver of the terminal set. The receiver must be able to resolve time intervals within the chip frequency in order to yield results in the 10 m range. The common surface of intersection of the circles indicates the probable area of the [temporary] residence of the terminal set.

Since the terminal set does not have any information about the frame synchronicity of the participating base stations, the determined residence site of the terminal set will have additional measuring errors.

To circumvent this, mainly two options are available:
The base stations are synchronized via a central clock or via GPS time.
Through measurements by the base stations the degree of asynchronicity with other base stations is determined and stored in a matrix.

Based on the determined residence site of the mobile station 30, the radio cell or base station of the GSM network best suited for a handover is determined with the aid of a data base available in the mobile communication network. In FIG. 1 this is for example the GSM base station 20, which inter alia supplies the GSM radio cell 1.

In order for the mobile station 30 to complete an HO to the appropriate GSM target cell 1, it is necessary to inform it of the target cell or the appropriate base station 20, after the local information (measured values) of the terminal set has been evaluated. This can be carried out directly in the form of an HO command to the mobile station.

This leads to the fact that the functionality of the appropriate network node, for example RNC, must be expanded to the effect that the evaluation of the measurement data yields a local information, therefrom by a best server data base the best supplying base station of the target cell is determined and made available to the terminal set and the base stations participating in the handover.

The invention claimed is:

1. Method for performing a blind handover in intersystem and interfrequency mobile communication systems, whereby a mobile station is adapted for being supplied with radio signals from base stations of a first mobile communication system and base stations of a second mobile communication system, comprising the steps of:
    making a mandatory request of the mobile station to perform a measurement of propagation times of the radio signals being transmitted via an air interface from the base stations of the first mobile communication system to the mobile station by providing the mobile station with specific signal level threshold values that compel a position measurement,
    measuring of propagation times of the radio signals by the mobile station,
    transmitting the measured propagation times one of the first base stations of the first mobile communication system,
    determining on the part of the first mobile communication system the residence site of the mobile station on the basis of the propagation time measurement data,
    selecting, based on the determined residence site of the mobile station and, with the aid of a data base at least one suitable base station of the second communication system for an intersystem or interfrequency handover,
    transmitting data of the selected base station required for a handover from the first mobile communication system to the mobile station, and
    performing the handover by the mobile station from a base station of the first mobile communication system to the selected base station of the second mobile communication system (20).

2. Method as claimed in claim 1, characterized in that by the mobile station (30) additionally the signal strength and/or the signal quality of the base stations (23, 24) are measured and transmitted to one of the base stations.

3. Method as claimed in claim 1, characterized in that the mobile station (30) during the handover changes the utilized radio frequencies.

4. Method as claimed in claim 1, characterized in that the effective coverage range of the base station (24) supplying the mobile station before the handover differs from the effective coverage range of the base station (20) supplying the mobile station after the handover.

5. Method as claimed in claim 1, characterized in that the effective coverage range of the base station (24) supplying the mobile station before the handover overlaps the effective coverage range of the base station (20) supplying the mobile station after the handover.

6. Method as claimed in claim 1, characterized in that the precise residence site of the mobile station (30) is determined by means of a GPS receiver.

7. Method as claimed in claim 1, characterized in that by means of a central clock a frame synchronization is carried out between the participating base stations (23, 24).

8. Method as claimed in claim 1, characterized in that discrepancies of the frame synchronization between the base stations (23, 24) are determined, stored in a matrix and utilized for calculating the residence site of the mobile station (30).

9. Method as claimed in claim 1, characterized in that during the handover the mobile station (30) changes from a base station (24) of a first mobile communication system to a base station (20) of a second mobile communication system.

10. Method as claimed in claim 2, characterized in that during the handover the mobile station (30) changes from a base station (24) of a first mobile communication system to a base station (20) of a second mobile communication system.

11. Method for performing a blind handover in intersystem and interfrequency mobile communication systems as in claim 1, wherein said position measurement comprises measurement of propagation times.

12. Method for performing a blind handover in intersystem and interfrequency mobile communication systems as in claim 1, wherein said position measurement comprises the setting of network parameters for the network at the outset.

\* \* \* \* \*